F. P. REES.
MEASURING CABINET.
APPLICATION FILED DEC. 27, 1912.

1,077,999.

Patented Nov. 11, 1913.
2 SHEETS—SHEET 1.

Inventor
F. P. Rees,

F. P. REES.
MEASURING CABINET.
APPLICATION FILED DEC. 27, 1912.
1,077,999.
Patented Nov. 11, 1913.
2 SHEETS—SHEET 2.
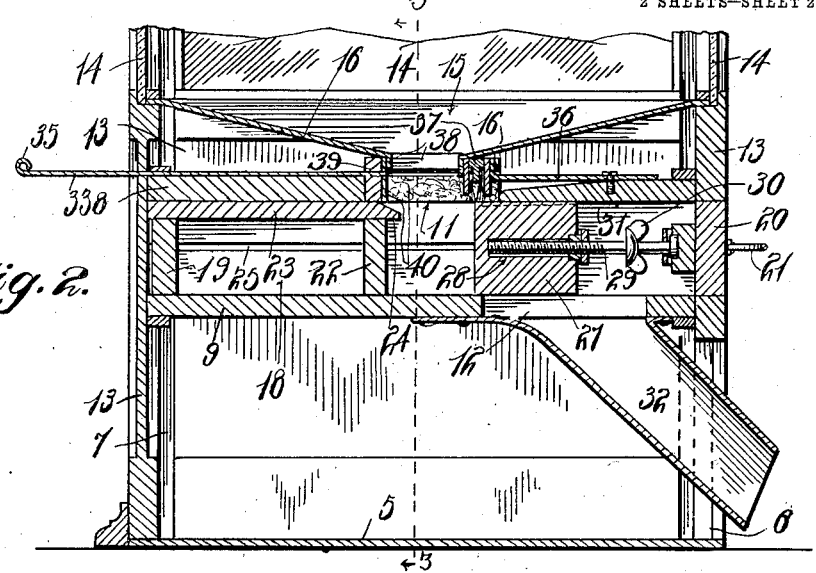
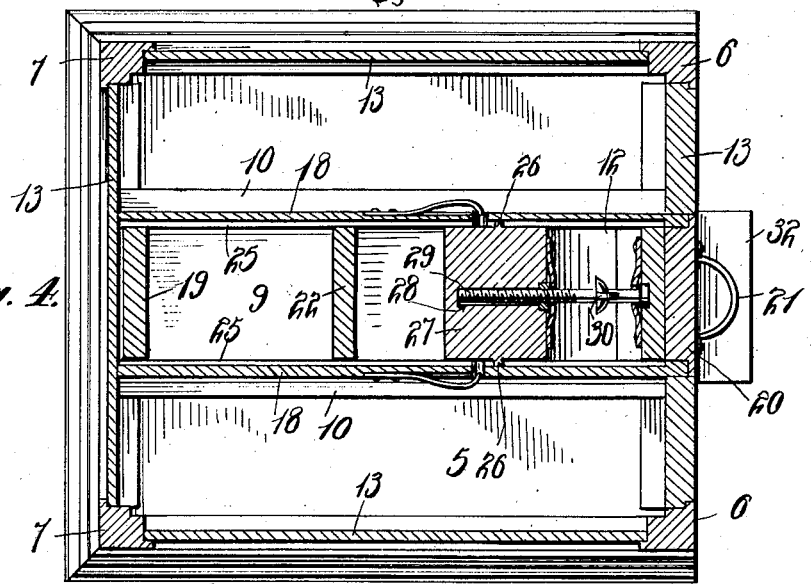
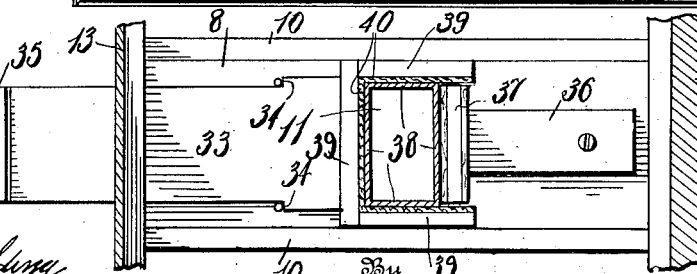
Witnesses
W. C. Fielding
H. M. Test
Inventor
F. P. Rees,
By Chandler & Chandler
Attorneys

UNITED STATES PATENT OFFICE.

FORREST P. REES, OF HUNTINGTON, INDIANA.

MEASURING-CABINET.

1,077,999.  Specification of Letters Patent.  Patented Nov. 11, 1913.

Application filed December 27, 1912. Serial No. 738,905.

*To all whom it may concern:*

Be it known that I, FORREST P. REES, a citizen of the United States, residing at Huntington, in the county of Huntington, State of Indiana, have invented certain new and useful Improvements in Measuring-Cabinets; and I do hereby declare the following to be a full, clear, and exact description of the invention, such as will enable others skilled in the art to which it appertains to make and use the same.

This invention relates to an improvement is measuring cabinets designed especially for grocers' use.

The principal object of the invention is to provide a cabinet including a hopper for containing beans, etc., and a measuring device adapted to be employed to measure a predetermined amount of the commodity to be sold depending upon the amount of purchase.

Another object of the invention is to provide a measuring device which can be easily removed from the cabinet whenever it is desired to clean the same.

A further object of the invention is to provide a cabinet of the character described, which is composed of a minimum number of parts, is therefore simple in construction, and is cheap to manufacture.

A still further object is to provide a simple means for leveling the measured amount as it is being removed.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction within the scope of the claim, may be resorted to without departing from the spirit or sacrificing any of the advantages of the invention.

Figure 1:
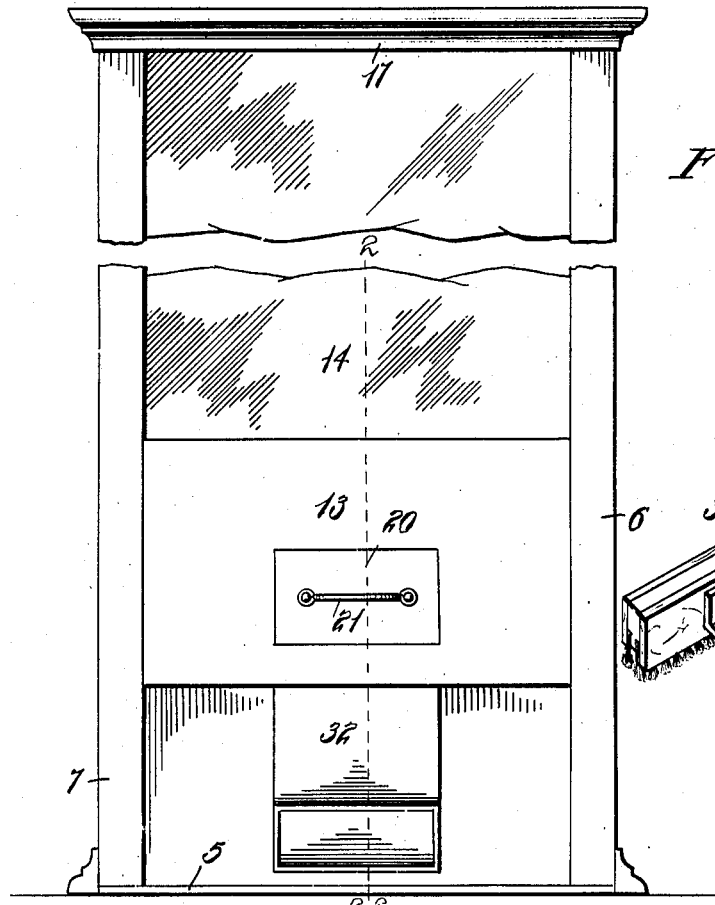
Figure 6:
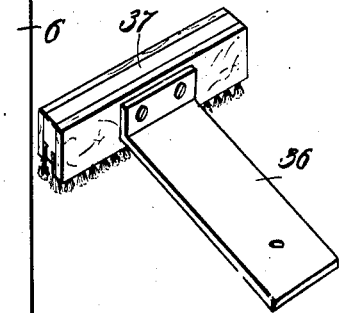
Figure 3:
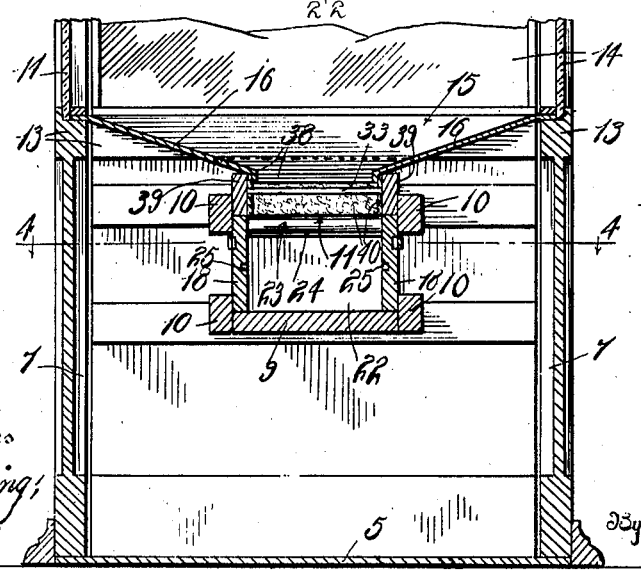

In the drawings: Figure 1 is a front elevation of a cabinet constructed in accordance with my invention, Fig. 2 is a vertical longitudinal sectional view through the same taken on the line 2—2 of Fig. 1, showing the measuring device in its normal or closed position, Fig. 3 is a transverse sectional view, on the line 3—3 of Fig. 2, Fig. 4 is a horizontal sectional view taken on the line 4—4 of Fig. 3, Fig. 5 is an enlarged detail sectional view of the center portion of the hopper, and Fig. 6 is a detail perspective view of the brush.

Like reference numerals designate corresponding parts in all figures of the drawings.

Referring to the drawings, the invention comprises a cabinet consisting of a base 5 having opposed pairs of side posts 6—6 and 7—7 secured thereto. Centrally disposed between the posts and secured thereto is a horizontal partition 8. Also secured to the posts below the partition 8 is a second partition 9. These partitions are connected by spaced longitudinal walls 10—10, said walls being set inwardly from the outer edges of said partitions. It will thus be observed that the partitions 8 and 9 and the walls 10 coöperate to form a guide. Centrally formed in the upper partition 8 is an opening 11 and formed in the partition 9, toward the front thereof is an opening 12.

Secured to the posts 6 and 7 above the partition 8 are walls 13 and above these walls are glass panels 14. A hopper 15 is provided with bottom members 16 which incline downwardly and centrally to the opening 11 of the partition 8. A removable cover 17 is associated with the top of the cabinet.

Depending below the central opening of the hopper bottom are the flanges 38, which are received within the space inclosed by the upstanding flanges 39 on the upper wall 8. Between the flanges 38 and 39 are packing strips 40 which prevent the leaking of finely divided materials as flour, sugar, or the like.

Disposed within the guide formed by the partitions 8 and 9 and the walls 10 is a measuring device, which consists of spaced side walls 18—18, a rear wall 19 and a front wall 20, said front wall being provided with an ordinary handle 21. A transverse partition 22 is centrally secured to the side walls 18. Secured to the side walls 18, rear wall 19 and the partition 22 is a plate 23, which has its forward edge sharpened as at 24. The transverse partition 22 is normally disposed in rear of the opening 11 of the partition 8 so that material from the hopper will readily flow through the opening 11 into the measuring device in front of said transverse partition. Formed in the forward ends of the inner faces of the side walls 18 are opposed longitudinal slots 25 which form guides for receiving ribs 26 carried by a sliding block 27. This block is centrally provided with a longitudinal bore 28 for receiving the rear end of a screw 29, the forward end of said screw being rotatably mounted in the front end wall 20 of said measuring device and carries a rigidly secured head 30. By means of the head 30 the screw 29 can be rotated, and depending upon the direction thus rotated, the block 27 can be shifted to or from the transverse partition 22 as the occasion may require to regulate the distance therebetween. Formed on the upper edge of one of the side walls 18 is a scale indicated as a whole by the reference numeral 31 which is adapted to coöperate with the front face of the block 27 to indicate the proper area of the pocket formed between the transverse wall 22 and said block 27. This scale is arranged with a series of numbers corresponding to the selling price per pound and by means of which any quantity of beans or the like can be readily determined.

Depending from the discharge opening 12 of the partition 9 is a spout 32 adapted to project into the mouth of a paper bag or the like held therebelow.

Slidably mounted upon the upper face of the upper partition 8 and in alinement with the discharge opening 11 thereof is a plate valve 33. This valve is formed of flat metal, and is provided with an opening 34 adapted in one position of the valve to register with said opening 11. Associated with the valve is a handle 35 by means of which said valve may be operated.

Secured at its forward end to the upper portion 8 and slightly in advance of the opening 11 is a flat spring 36, which carries on its rear end a brush 37. This brush projects into the opening 11 at the forward edge and wipes the top of the measured charge of the commodity as the measuring drawer is being withdrawn.

In practice, the cabinet is adapted to deliver five cents worth of beans, etc., at each operation. Should the commodity be selling at five cents per pound, the computer or block 23 is set to register with the indicator at 5. If the price advances to six cents, the operator then shifts the block until it registers with the scale at 6, and so on.

What is claimed is:

A measuring cabinet including a top, a base, inclosing walls, horizontal partitions formed with offset openings, a hopper supported above the upper partition and communicating with the opening thereof, packing strips secured within the opening of the hopper, a measuring device slidably mounted between the partitions, said device comprising a bottomless drawer having a transverse partition centrally secured to the side walls thereof, a top secured to the rear portions of the side walls, a block slidably mounted within the forward portion of the drawer, a screw having one end rotatably mounted in the front wall of the drawer, the threaded end of the screw being engaged in the block, and an operating means carried by the screw between the block and said front wall.

In testimony whereof, I affix my signature, in the presence of two witnesses.

FORREST P. REES.

Witnesses:
W. O. MENDENHALL,
R. O. KAYLOR.